United States Patent [19]

Stover

[11] Patent Number: 5,208,098
[45] Date of Patent: May 4, 1993

[54] SELF-BONDED NONWOVEN WEB AND POROUS FILM COMPOSITES

[75] Inventor: Walter H. Stover, Marietta, Ga.

[73] Assignee: Amoco Corporation, Chicago, Ill.

[21] Appl. No.: 601,519

[22] Filed: Oct. 23, 1990

[51] Int. Cl.⁵ .............................................. B32B 27/34
[52] U.S. Cl. ................................. 428/284; 428/171; 428/172; 428/287; 428/296; 428/297; 428/298
[58] Field of Search ...................... 428/332, 348, 474.4, 428/475.2, 480, 482, 296, 288, 903, 219, 284, 286, 297, 298, 171, 172, 287

[56] References Cited

U.S. PATENT DOCUMENTS

| | | | |
|---|---|---|---|
| 3,376,238 | 4/1968 | Gregorian et al. | 260/2.5 |
| 3,407,253 | 10/1968 | Yoshimura et al. | 264/289 |
| 3,607,793 | 9/1971 | Mahlmann | 260/2.5 M |
| 3,839,240 | 10/1974 | Zimmerman | 260/2.5 HA |
| 3,839,516 | 10/1974 | Williams et al. | 264/41 |
| 3,844,865 | 10/1974 | Elton et al. | 156/229 |
| 3,920,785 | 11/1975 | Druin et al. | 260/210 |
| 3,956,020 | 5/1976 | Weininger et al. | 136/146 |
| 3,969,562 | 7/1976 | Suzuki | 428/155 |
| 4,076,656 | 2/1978 | White et al. | 260/2.5 M |
| 4,105,737 | 8/1978 | Suzuki | 264/154 |
| 4,116,892 | 9/1978 | Schwarz | 521/62 |
| 4,138,459 | 2/1979 | Brazinsky et al. | 264/154 |
| 4,153,751 | 5/1979 | Schwarz | 428/304 |
| 4,289,832 | 9/1981 | Schwarz | 428/542 |
| 4,340,563 | 7/1982 | Appel et al. | 264/518 |
| 4,386,129 | 5/1983 | Jacoby | 428/215 |
| 4,684,568 | 8/1987 | Lou | 428/265 |
| 4,766,029 | 8/1988 | Brock et al. | 428/286 |
| 4,790,736 | 12/1988 | Keuchel | 425/66 |
| 4,863,785 | 9/1989 | Berman et al. | 428/218 |
| 4,975,469 | 12/1990 | Jacoby et al. | 521/143 |
| 5,073,436 | 12/1991 | Antonacci et al. | 428/219 |

FOREIGN PATENT DOCUMENTS

| | | |
|---|---|---|
| 0258002 | 3/1988 | European Pat. Off. |
| 0273582 | 7/1988 | European Pat. Off. |
| 0288257 | 10/1988 | European Pat. Off. |
| 0306818 | 3/1989 | European Pat. Off. |

*Primary Examiner*—James J. Bell
*Attorney, Agent, or Firm*—Robert G. Ladd; Wallace L. Oliver; Frank J. Sroka

[57] ABSTRACT

A self-bonded nonwoven web and porous film composite comprising at least one layer of a self-bonded, fibrous nonwoven web comprising substantially continuous filaments adhered to at least one layer of a polymeric porous film and having vapor-permeable and liquid-impermeable properties.

17 Claims, 2 Drawing Sheets

SELF-BONDED NONWOVEN WEB AND POROUS FILM COMPOSITES

FIELD OF INVENTION

This invention relates to self-bonded nonwoven web and porous film composites comprising at least one layer of a uniform basis weight self-bonded, fibrous nonwoven web comprising substantially randomly disposed, substantially continuous thermoplastic filaments adhered to at least one layer of a polymeric porous film.

BACKGROUND OF THE INVENTION

Composites of porous film and spunbonded polypropylene useful as construction fabric such as housewrap are known. Porous melt-processed polymeric films can be made by various processes including three basis types of processes. The three process categories are processes for stretching films of neat, unblended polymers containing no fillers other than typical stabilizer additives; processes for making films from blends of two or more polymers, or from a blend of a polymer with mineral oil or an organic salt in which the dispersed phase can be extracted with the film stretched either before or after the extraction; and processes for casting films made from a polymer that has been blended with a filler such as calcium carbonate or barium sulfate with the film stretched after casting.

In the first category, a common method of producing such films involves drawing or stretching a crystalline, elastic starting film to about 10 to 300 percent of its original length as exemplified by U.S. Pat. Nos. 3,839,240 and 4,138,459. This drawing operation is said to produce a microporous film ordinarily having elongated, slit-like pores with pore sizes up to 1.2 microns. U.S. Pat. No. 3,920,785 describes post-treating a stretched film with an organic solvent to increase the gas transmission rate of the film. U.S. Pat. No. 4,105,737 describes a process for producing a porous film by forming many fine cracks in a stretchable polymer composition having a fine phase separation structure, heating the polymer composition to its stretching temperature under tension so that the fine cracks do not disappear, and enlarging the cracks by stretching the film at the stretching temperature. U.S. Pat. No. 3,839,516 describes a process for swelling a polyolefin film by immersing the film in a solvent such as toluene or benzene, stretching the polyolefin film in the swollen state and drying the film under tension to form pores.

In the second category, U.S. Pat. No. 3,956,020 describes a process for dissolving a benzoate salt from a polymer article to form an ultrafine porous article. U.S. Pat. No. 4,076,656 describes a process to incorporate a water soluble liquid into a polymer and to extract the liquid with water. In U.S. Pat. No. 3,607,793, a hydrocarbon liquid is extracted from a polymeric gel. U.S. Pat. No. 3,407,253 describes a process to form sheets from blends of polypropylene and an elastomer such as polyisobutylene which are drawn to create internal voids, thereby imparting some breathability. U.S. Pat. No. 3,969,562 describes a process of blending two crystalline polymers together, extruding a sheet, cold stretching the sheet to open up crazes and then hot stretching the sheet biaxially to increase porosity. U.S. Pat. Nos. 4,116,892, 4,153,751 and 4,289,832 describe a process of extruding incompatible polymer blends into a sheet and then stretching the sheet by drawing it over a grooved roller at low temperatures to generate porosity. EP 0 273 582A describes a process in which polypropylene is blended with mineral oil and a nucleating agent and a cast film is produced. The mineral oil phase separates as droplets within the polypropylene matrix, and the droplets are removed by running the film through an extraction bath. EP 0 258 002A describes a process in which a hydrophilic polymer such as polyethylene oxide is crosslinked with UV radiation, with uncrosslinked polyethylene oxide extracted with water and the film is dried to produce a film containing pores filled by interconnecting plugs of polyethylene oxide. According to this publication, the moisture vapor transmission rate (MVTR) of the formed material is typically 10,000 $g/m^2/24$ hr or greater.

In the third category, U.S. Pat. No. 3,844,865 describes a process in which blends of a polymer and an inorganic salt, such as calcium carbonate, are formed into films and stretched uniaxially or biaxially to obtain a high MVTR. U.S. Pat. No. 3,376,238 describes a process in which blends of polyethylene with sugar, starch and silica gel are prepared and cast into film with the film crosslinked with peroxide or radiation, and then pore formers are extracted at elevated temperatures with the films optionally biaxially stretched before an extraction step.

Spunbond polymeric nonwoven webs can be produced by extruding a multiplicity of continuous thermoplastic polymer strands through a die in a downward direction onto a moving surface where the extruded strands are collected in a randomly distributed fashion. The randomly distributed strands are subsequently bonded together by thermobonding or by needlepunching to provide sufficient integrity in a resulting nonwoven web of continuous fibers. One method of producing spunbond nonwoven webs is disclosed in U.S. Pat. No. 4,340,563. Spunbond webs are characterized by a relatively high strength/weight ratio, isotropic strength, high porosity and abrasion resistance properties. Spunbond nonwoven webs are nonuniform in properties such as basis weight and coverage.

U.S. Pat. No. 4,766,029 discloses a house wrap material consisting of a three-layer, semi-permeable nonwoven laminate having two exterior layers of spunbond polypropylene and an interior two-component meltblown layer of polyethylene and polypropylene in which the laminate is calendered after formation so that the polyethylene melts and flows to close up the interstitial spaced and bond the layers together.

U.S. Pat. No. 4,684,568 discloses a process for preparing fabrics that are permeable to moisture vapor and impermeable to liquid water consisting essentially of the steps of applying a continuous coating of polypropylene to a surface of a vapor and liquid permeable, fibrous sheet and then calendering the coated surface. The fabrics are disclosed as being suited for use as roofing-tile underlayment and building air-infiltration barriers.

European Patent Application No. 0 306 818 discloses a process for producing a barrier fabric which is permeable to liquid vapors and impermeable to liquids by laminating a vapor impermeable film to a reinforcing porous fibrous film such as a spunbonded polypropylene to form a composite web and then needing the film of the composite web with tapered needles to form a plurality of micropores through the film.

European Patent Application No. 0 288 257 discloses a flexible membrane useful as lining for roof or walls which is impermeable to liquid water but permeable to air and water vapor made of two spunbonded polypropylene layers adhesively bonded together by a discontinuous and porous layer of polyolefin material.

A major limitation of nonwoven composites comprising spunbond webs is that the spunbond web used to impart strength to the composite, especially in the cross-machine direction, is typically nonuniform in basis weight and coverage such that relatively "thick" and "thin" areas are easily recognized by the human eye. In many applications, attempts have been made to compensate for these poor fabric aesthetics and limiting physical properties that result from this nonuniformity of basis weight and coverage by using spunbond webs having a heavier basis weight than would normally be required by the particular application if the spunbond web had a more uniform coverage and basis weight. This, of course, adds to the cost of the composite product and contributes to greater stiffness, increased bulk and other undesirable features.

In view of the limitations of spunbond nonwoven webs in multi-layer nonwoven web composites, there is a need for improved nonwoven web composites and, in particular, those wherein a self-bonded, fibrous nonwoven web having very uniform basis weight and balanced physical properties is used for at least one layer and is adhered to at least one layer of a porous film. These composites find particular use for vapor-permeable and liquid-impermeable product applications for example, air-infiltration barriers, house wrap, roofing-tile underlayment, covers for automobiles, motor bikes, stationary equipment and the like, and construction fabric for medical apparel, general protection and chemical protection, and liners for sporting apparel and the like.

The above patents do not disclose the invented self-bonded nonwoven web composite comprising at least one layer of a polymeric porous film adhered to at least one layer of a uniform basis weight self-bonded, fibrous nonwoven web which provides a lighter and more uniform basis weight layer of nonwoven web having vapor-permeable and liquid-permeable properties.

An object of the present invention is to provide improved composite fabric structures.

Another object of the present invention is to provide a self-bonded nonwoven web and porous film composite comprising at least one layer of a uniform basis weight self-bonded, fibrous nonwoven web comprising a plurality of substantially randomly disposed, substantially continuous thermoplastic filaments wherein the web has a Basis Weight Uniformity Index (BWUI) of $1.0 \pm 0.05$ determined from average basis weights having standard deviations of less than 10% adhered to at least one layer of a polymeric porous film.

The objects of the present invention are also attained with a self-bonded nonwoven web and porous film composite having a basis weight of about 0.2 oz/yd$^2$ or greater, comprising at least one layer of a uniform basis weight self-bonded, fibrous nonwoven web having a basis weight of about 0.1 oz/yd$^2$ or greater and a BWUI of $1.0 \pm 0.05$ determined from average basis weights having standard deviations of less than 10% comprising a plurality of substantially randomly disposed, substantially continuous thermoplastic filaments, wherein the filaments comprise a thermoplastic selected from the group consisting of polypropylene, ethylene-propylene copolymer, high density polyethylene, low density polyethylene, linear low density polyethylene, polyamides, polyesters, a blend of polypropylene and polybutene, and a blend of polypropylene and linear low density polyethylene wherein said filaments have deniers in the range of about 0.5 to about 20, such layer being adhered to at least one layer of a polymeric porous film having a basis weight of 0.1 oz/yd$^2$ or greater and a moisture vapor transmission rate (MVTR) of about 100 g/m$^2$/24 hr or greater as determined according to ASTM E-96, procedure E.

The objects of the present invention are further attained with a self-bonded nonwoven web and porous film composite having a basis weight in the range of about 1.0 to about 6.0 oz/yd$^2$, comprising at least two layers of a uniform basis weight self-bonded, fibrous nonwoven web having a basis weight of about 0.25 oz/yd$^2$ or greater and a BWUI of $1.0 \pm 0.05$ determined from average basis weights having standard deviations of less than 10% comprising a plurality of substantially randomly disposed, substantially continuous thermoplastic filaments, the filaments comprising a thermoplastic selected from the group consisting of polypropylene, a blend of polypropylene and polybutene and a blend of polypropylene and linear low density polyethylene and having deniers of about 0.5 to about 20 with the layers adhered to at least one layer of an oriented polymeric porous film having a basis weight of about 0.5 oz/yd$^2$ or greater comprising a propylene-based resin film made from about 70 to 100 wt % of a polypropylene having a melt flow rate of about 1.0 to about 10 as measured by ASTM D-1238 and about 30 to 0 wt % of an ethylene-propylene copolymer having an ethylene content of about 10 to about 50 wt % and a melt flow rate of about 0.5 to about 10 as measured by ASTM D-1238 and formed by the steps of:

(a) dispersing in a propylene-based resin a nucleating agent capable of producing beta-spherulites, (b) extruding the nucleating agent-containing propylene-based resin into a film, (c) cooling the film below the crystallization temperature of the propylene-based resin to form at least 20 wt % of beta-spherulites in the film, (d) extracting selectively the beta-spherulites in an amount corresponding to at least 15 wt % of the propylene-based resin from the cooled film with an extraction solvent to form a porous film, and (e) orienting the porous film by heating the porous film at a temperature of about 115° to about 135° C. for a time period of about 2 to about 20 seconds and stretching the heated porous film in at least one direction at a stretch ratio of about 1.5 to about 7.5 to form the oriented polymeric porous film.

Among the advantages obtained from the self-bonded nonwoven web and porous film composites of the present invention are improved hydrostatic waterproofness, improved MVTR and improved strength per unit of basis weight. The composites of the present invention have improved barrier protection from water, solvents, hazardous chemicals and blood compared to spunbond nonwovens or spunbond/meltblown/spunbond composites with the improved barrier protection being advantageous for medical apparel, general protection and chemical protection apparel and liners for sporting apparel. These improvements are achieved due to the very uniform basis weight property of the self-bonded, fibrous nonwoven web which enables these self-bonded webs to be used to provide strength to the composites and can result in lower overall basis weights of the fabrics. Improved cross-machine direction tensile strength per unit of composite basis weight is achieved due to the excellent cross-machine direction tensile strength and uniform basis weights exhibited by the self-bonded, fibrous nonwoven webs used in making the composites of the present invention. Oriented porous films having a MVTR of 100 g/m$^2$/24 hours or greater contribute to the improved moisture transmission rates of the composites of self-bonded nonwoven web and porous film.

SUMMARY OF THE INVENTION

Briefly, this invention provides a self-bonded nonwoven web and porous film composite comprising at least one layer of a uniform basis weight self-bonded, fibrous nonwoven web comprising a plurality of substantially randomly disposed, substantially continuous thermoplastic filaments wherein the web has a BWUI of 1.0±0.05 determined from average basis weights having standard deviations of less than 10% adhered to at least one layer of a polymeric porous film.

In another aspect, the present invention provides a self-bonded nonwoven web and porous film composite having a basis weight of about 0.2 oz/yd$^2$ or greater, comprising at least one layer of a uniform basis weight self-bonded, fibrous nonwoven web having a basis weight of about 0.1 oz/yd$^2$ or greater and a BWUI of 1.0±0.05 determined from average basis weights having standard deviations of less than 10% comprising a plurality of substantially randomly disposed, substantially continuous thermoplastic filaments, wherein the filaments comprise a thermoplastic selected from the group consisting of polypropylene, ethylene-propylene copolymer, high density polyethylene, low density polyethylene, linear low density polyethylene, polyamides, polyesters, a blend of polypropylene and polybutene, and a blend of polypropylene and linear low density polyethylene wherein said filaments have deniers in the range of about 0.5 to about 20, such layer being adhered to at least one layer of a polymeric porous film having a basis weight of about 0.1 oz/yd$^2$ or greater and a MVTR of about 100 g/m$^2$/24 hr or greater as determined according to ASTM E-96, procedure E.

In another aspect, the present invention provides a self-bonded nonwoven web and porous film composite having a basis weight in the range of about 1.0 to about 6.0 oz/yd$^2$, comprising at least two layers of a uniform basis weight self-bonded, fibrous nonwoven web having a basis weight of about 0.25 oz/yd$^2$ or greater and a BWUI of 1.0±0.05 determined from average basis weights having standard deviations of less than 10% comprising a plurality of substantially randomly disposed, substantially continuous thermoplastic filaments, the filaments comprising a thermoplastic selected from the group consisting of polypropylene, a blend of polypropylene and polybutene, and a blend of polypropylene and linear low density polyethylene and have deniers of about 0.5 to about 20 with the layers adhered to at least one layer of an oriented polymeric porous film having a basis weight of about 0.5 oz/yd$^2$ or greater comprising a propylene-based resin film made from about 70 to 100 wt % of a polypropylene having a melt flow rate of about 1.0 to about 10 as measured by ASTM D-1238 and about 30 to 0 wt % of an ethylene-propylene copolymer having an ethylene content of about 10 to about 50 wt % and a melt flow rate of about 0.5 to about 10 as measured by ASTM D-1238 and formed by the steps of:

(a) dispersing in a propylene-based resin a nucleating agent capable of producing beta-spherulites, (b) extruding the nucleating agent-containing propylene-based resin into a film, (c) cooling the film below the crystallization temperature of the propylene-based resin to form at least 20 wt % of beta-spherulites in the film, (d) extracting selectively the beta-spherulites in an amount corresponding to at least 15 wt % of the propylene-based resin from the cooled film with an extraction solvent to form a porous film, and (e) orienting the porous film by heating the porous film at a temperature of about 115° to about 135° C. for a time period of about 2 to about 20 seconds and stretching the heated porous film in at least one direction at a stretch ratio of about 1.5 to about 7.5 to form the oriented polymeric porous film.

DETAILED DESCRIPTION OF THE INVENTION

Figure 1:
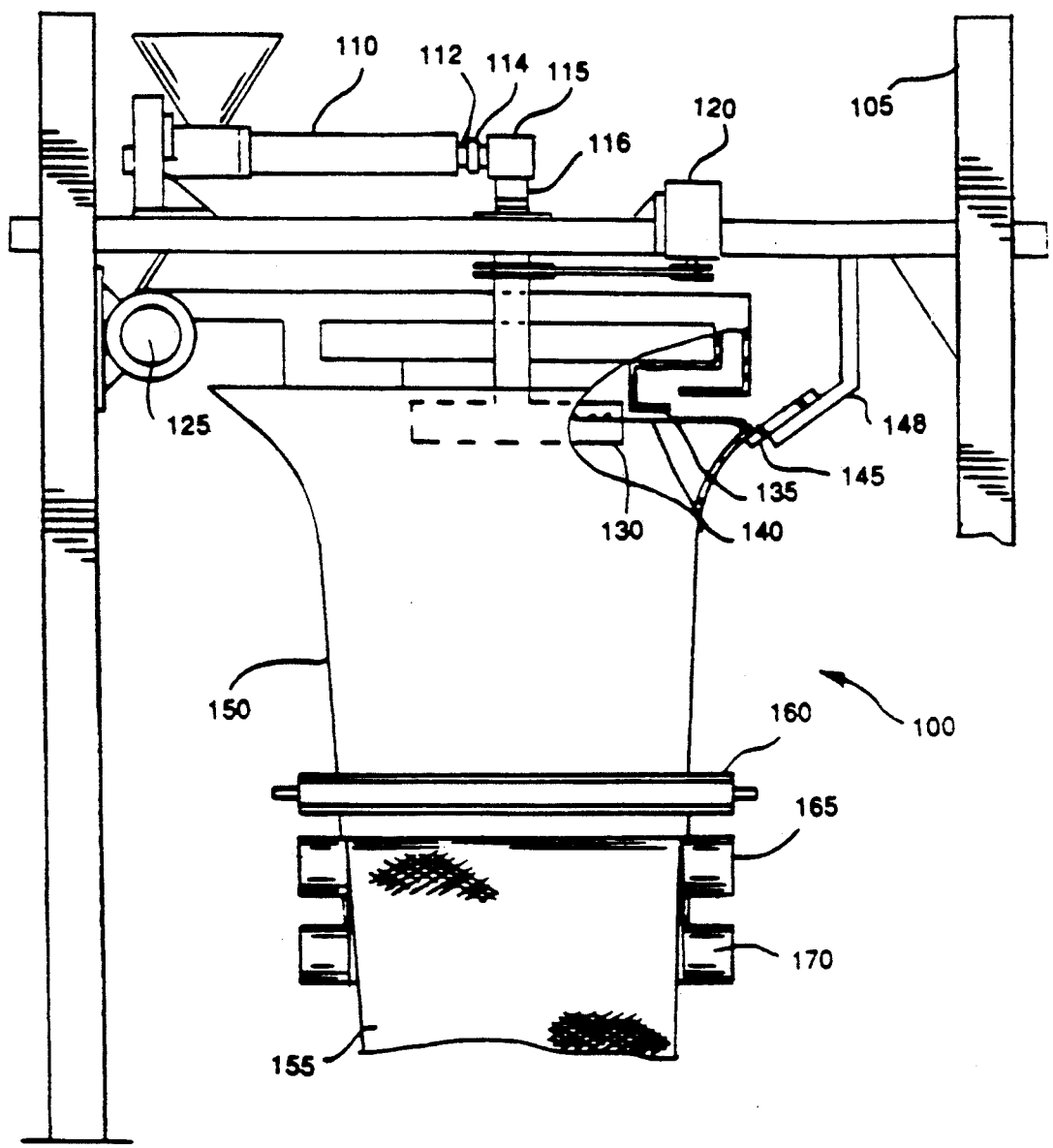
FIG. 1 is a schematic illustration of the system used to produce the self-bonded, fibrous nonwoven web used as at least one layer of the self-bonded nonwoven web and porous film composite of the present invention.

The multi-layer composite of the present invention is a nonwoven web composite comprising at least one layer of a self-bonded, fibrous nonwoven web and at least one layer of a polymeric porous film.

By "nonwoven web" it is meant a web of material which has been formed without the use of weaving processes and which has a construction of individual fibers, filaments or threads which are substantially randomly disposed.

By "uniform basis weight nonwoven web" it is meant a nonwoven web comprising a plurality of substantially randomly disposed, substantially continuous polymeric filaments having a Basis Weight Uniformity Index (BWUI) of 1.0±0.05 determined from average basis weights having standard deviations of less than 10%. BWUI is defined as a ratio of an average unit area basis weight determined on a unit area sample of web to an average basis weight determined on an area of web, N times as large as the unit area, wherein N is about 12 to about 18, the unit area is 1 in$^2$ and the standard deviations of the average unit area basis weight and of the average basis weight of the area N times as large as the unit area are each less than 10% and the number of samples is sufficient to obtain basis weights at a 0.95 confidence interval. As used herein, in the determination of BWUI, both the average unit area basis weight and the average area basis weight of the area N times as large as the unit area must have standard deviations of less than 10% where "average" and "standard deviation" have the definitions generally ascribed to them by the science of statistics. Nonwoven webs having BWUI's of 1.0±0.05 determined from average basis weights having standard deviations of less than 10% determined from basis weight averages having standard deviations greater than 10% for one or both of the averages do not represent a uniform basis weight nonwoven web as defined herein and are poorly suited for use in making the invented composites because the non-uniformity of basis weights may require heavier basis weight materials to be used to obtain the desired coverage and fabric aesthetics. Unit area samples below about 1 in² in area for webs which have particularly nonuniform basis weight and coverage would represent areas too small to give a meaningful interpretation of the unit area basis weight of the web. The samples on which the basis weights are determined can be any convenient shape, such as square, circular, diamond and the like, with the samples cut randomly from the fabric by punch dies, scissors and the like to assure uniformity of the sample area size. The larger area is about 12 to about 18 times the area of the unit area. The larger area is required to obtain an average basis weight for the web which will tend to "average out" the thick and thin areas of the web. The BWUI is then calculated by determining the ratio of the average unit area basis weight to the average larger area basis weight. For example, for a nonwoven web in which 60 samples of 1 in² squares determined to have an average basis weight of 0.993667 oz/yd² and a standard deviation (SD) of 0.0671443 (SD of 6.76% of the average) and 60 samples of 16 in² squares (N was 16) determined to have an average basis weight of 0.968667 oz/yd² and a standard deviation of 0.0493849 (SD of 5.10% of the average), the calculated BWUI was 1.026. A BWUI of 1.0±0.05 determined from average basis weights having standard deviations of less than 10% indicates a web with a very uniform basis weight. Materials having BWUI values of less than 0.95 or more than 1.05 are not considered to have uniform basis weights as defined herein. Preferably, the uniform basis weight nonwoven web has a BWUI value of 1.0±0.03 and a basis weight of about 0.1 oz/yd² or greater.

By "self-bonded" it is meant that the crystalline and oriented filaments or fibers in the nonwoven web adhere to each other at their contact points thereby forming a self-bonded, fibrous nonwoven web. Adhesion of the fibers may be due to fusion of the hot fibers as they contact each other, to entanglement of the fibers with each other or to a combination of fusion and entanglement. Of course, bonding does not occur at all contact points. Generally, however, the bonding of the fibers is such that the nonwoven web, after being laid down and before further treatment, has sufficient machine direction (MD) and cross-machine direction (CD) tensile strength to allow handling of the web without additional treatment. No foreign material need be present to promote bonding, and essentially no polymer flows to the intersection points as distinguished from that which occurs during the process of heat-bonding thermoplastic filaments. The bonds are weaker than the filaments as evidence by the observation that an exertion of a force tending to disrupt the web, as in tufting, will fracture bonds before breaking filaments. Prebonding is not necessary due to the integrity of the self-bonded web as produced, but of course, the self-bonded web can be prebonded before being used, if desired, e.g., by a calendering operation, adhesives or other prebonding type processes.

By "substantially continuous," in reference to polymeric filaments of the self-bonded webs, it is meant that a majority of the filaments or fibers formed are substantially continuous nonbroken fibers as they are drawn and formed into the self-bonded web.

The polymeric porous films used in at least one layer of the self-bonded nonwoven web and porous film composites of the present invention can be prepared from any suitable film-forming polymeric composition, such as polyolefins, polyamides, polyesters and the like. Particularly useful are polyolefin compositions such as polypropylene, linear low density polyethylene, low density polyethylene, ethylene-propylene copolymers, blends of polypropylene and polybutene, and blends of polypropylene and low density polyethylene and mixtures of polyolefin compositions. Porous melt-processed polymeric films can be made by various processes including processes for stretching films of neat, unblended polymers containing no fillers other than typical stabilizer additives; processes for making films from blends of two or more polymers, or from a blend of a polymer with mineral oil or an organic salt in which the dispersed phase can be extracted with the film stretched either before or after the extraction; and processes for casting films made from a polymer that gas been blended with a filter such as calcium carbonate or barium sulfate with the film stretched after casting.

Propylene-based resins useful for producing the oriented porous film used in multi-layer composites of the instant invention have at least 40% crystallinity and typically at least 50% crystallinity as determined by x-ray diffraction analysis. Suitable propylene-based resins include not only propylene homopolymers but also copolymers of propylene containing up to 50 wt. % of another alpha-olefin such as ethylene or mixtures of alpha-olefins. Also, blends of propylene-based homopolymers with other polyolefins such as high density polyethylene, low density polyethylene, linear low density polyethylene, polybutene and ethylene-propylene copolymers can be used. The propylene-based resin may have any degree of polymerization so long as it is capable of being melt-extruded to form a film typically with a melt flow rate of about 0.5 to 20 g/10 min as measured at 230° C. under a load of 2.16 kg as specified by ASTM D1238-70, preferably with a melt flow rate of 1.0 to about 10 g/10 min.

In one embodiment, a film useful for the polymeric porous film layer of the composites of the present invention can be formed by the steps of:

(a) forming a homogeneous blend of a propylene-based resin and about 0.5 to about 10 ppm of a nucleating agent capable of producing beta-spherulites, (b) extruding the blend into a film having a thickness of about 0.01 to about 0.4 millimeters on a cast film line having a chill roll temperature of about 90° to about 130° C., (c) cooling the film below the crystallization temperature of the propylene-based resin to form at least 20 wt % beta-spherulites in the film, (d) extracting beta-spherulites corresponding to at least 15 wt % of the blend from the cast film by immersing the cast film in a toluene bath at a temperature of about 85° to about 95° C. for a time period of 10 minutes or less to form a porous film and drying the porous film at a temperature of about 15° to about 110° C. for 20 minutes or less, and (e) orienting the porous film by heating the porous film at a temperature of about 115° to about 135° C. for a time period of about 2 to about 20 seconds and stretching the heated porous film in at least one direction at a stretch ratio of about 1.5 to about 7.5 to form the oriented porous film.

The oriented porous film described above can have a MVTR of about 2,000 g/m²/24 hr or greater as determined according to ASTM E-96, procedure E and the propylene-based resin used to make the oriented porous film can be a polypropylene having a melt flow rate of about 1.0 to about 10 as measured by ASTM D-1238. The propylene-based resin can also be a blend of from about 70 to 100 wt % of a polypropylene having a melt flow rate of about 1.0 to about 10 as measured by ASTM D-1238 and about 30 to 0 wt % of an ethylene-propylene copolymer having an ethylene content of about 10 to about 50 wt % and a melt flow rate of about 0.5 to about 10 as measured by ASTM D-1238. Optionally, a third polymeric component such as a low molecular weight polypropylene homopolymer or random copolymer can also be incorporated into the blend.

Other porous films useful for the polymeric porous film layer of the present invention include commercially available porous films such as a $CaCO_3$ filled low density polyethylene film of Consolidated Thermoplastics Co. having a MVTR of about 100 $g/m^2/24$ hr as measured according to ASTM E-96, procedure E, and a waterproof breathable film, Thintec ®, of 3M Company.

The self-bonded, fibrous nonwoven web of substantially randomly disposed, substantially continuous polymeric filaments used in the multi-layer nonwoven web composites of the present invention can be formed by the apparatus disclosed in U.S. Pat. No. 4,790,736, incorporated herein by reference. In a preferred embodiment, the self-bonded webs are prepared by:

(a) extruding a molten polymer through multiple orifices located in a rotating die;
(b) contacting said extruded polymer while hot as it exits said orifices with a fluid stream to form substantially continuous filaments and to draw said filaments into fibers having deniers in the range of about 0.5 to about 20; and
(c) collecting said drawn fibers on a collection device whereby the filaments extruded through the die strike the collection device and self-bonded to each other to form the nonwoven web.

A source of liquid fiber-forming material such as a thermoplastic melt is provided and pumped into a rotating die having a plurality of spinnerets about its periphery. The rotating die is rotated at an adjustable speed such that the periphery of the die has a surface speed of about 150 to 2000 m/min. The spinning speed is calculated by multiplying the periphery circumference by the rotating die rotation speed measured in revolutions per minute.

The thermoplastic polymer melt is extruded through a plurality of spinnerets located about the circumference of the rotating die. There can be multiple spinning orifices per spinneret and the diameter of an individual spinning orifice can be between about 0.1 to about 2.5 mm, preferably about 0.2 to about 1.0 mm. The length-to-diameter ratio of the spinneret orifice is about 1:1 to about 10:1. The particular geometrical configuration of the spinneret orifice can be circular, elliptical, trilobal or any other suitable configuration. Preferably, the configuration of the spinneret orifice is circular or trilobal. The rate of polymer extruded through the spinneret orifices can be about 0.05 lb/hr/orifice or greater. Preferably, for uniform production, the extruded polymer rate is about 0.2 lb/hr/orifice or greater.

As the fibers extrude horizontally through spinneret orifices in the circumference of the rotating die, the fibers assume a helical orbit as the distance increases from the rotating die. The fluid stream which contacts the fibers can be directed downward onto the fibers, can be directed to surround the fibers or can be directed essentially parallel to the extruded fibers. The fluid stream is typically ambient air which can also be conditioned by heating, cooling, humidifying or dehumidifying. A pressure air blower fan can be used to generate a quench air stream. Polymer fibers extruded through the spinneret orifices of the rotary die are contacted by the quench air stream.

The quench air stream can be directed radially above the fibers which are drawn toward the high velocity air stream as a result of a partial vacuum created in the area of the fiber by the air stream. The polymer fibers then enter the high velocity air stream and are drawn, quenched and transported to a collection surface. The high velocity air, accelerated and distributed in a radial manner, contributes to the attenuation or drawing of the radially extruded thermoplastic melt fibers. The accelerated air velocities contribute to the placement or "laydown" of fibers onto a circular fiber collector surface or collector such that self-bonded, fibrous nonwoven webs are formed that exhibit improved properties, including increased tensile strength, lower elongation and more balanced physical properties in the machine direction and cross-machine direction from filaments having deniers ranging from about 0.5 to about 20 as well as webs which have a very uniform basis weight with BWUI's of 1.0±0.05 determined from average basis weights having standard deviations of less than 10%. Preferably, the filament deniers are in the range of about 0.5 to about 20, which for polypropylene corresponds to filament diameters of about 5 to about 220 microns.

The fibers are conveyed to the collector by air speeds which promote entanglement of the fibers for web integrity. The fibers move at a speed dependent upon the speed of rotation of the die as they are drawn down, and by the time the fibers reach the outer diameter of the orbit, they are not moving circumferentially, but are merely being laid down in that particular orbit basically one on top of another. The particular orbit may change depending upon variation of rotational speed of the die, polymer extrudate rate, polymer extrudate temperature and the like. External forces such as electrostatic charge or air pressure can be used to alter the orbit and, therefore, deflect the fibers into different patterns.

The uniform basis weight self-bonded, fibrous nonwoven webs are produced by allowing the extruded thermoplastic fibers to contact each other as the fibers are deposited on a collection surface. Many of the fibers, but not all, adhere to each other at their contact points thereby forming the self-bonded, fibrous nonwoven web. Adhesion of the fibers may be due to fusion of the hot fibers as they contact each other, to entanglement of the fibers with each other or to a combination of fusion and entanglement. Generally, the adhesion of the fibers is such that the nonwoven web, after being laid down but before further treatment, has sufficient MD and CD strength to allow handling of the web without additional treatment as generally required by spunbond nonwoven webs.

The self-bonded nonwoven fabric conforms to the shape of the collection surface which can be of various shapes such as a cone-shaped inverted bucket, a moving screen or a flat surface in the shape of an annular strike plate locates slightly below the elevation of the die and with the inner diameter of the annular strike plate being at an adjustable, lower elevation than the outer diameter of the strike plate.

When an annular strike plate is used as the collection surface, fibers are bonded together during contact with each other and the annular strike plate and produce a nonwoven fabric which is drawn back through the aperture of the annular strike plate as a tubular fabric. A stationary spreader can be supported below the rotary die to spread the fabric into a flat, two-ply fabric which is collected by a pull roll and winder. In the alternative, a knife arrangement can be used to cut the tubular, two-ply fabric into a single-ply fabric which can be collected by a pull roll and winder.

Temperature of the thermoplastic melt affects the process stability for the particular thermoplastic used. The temperature must be sufficiently high so as to enable drawdown, but not too high so as to allow excessive thermal degradation of the thermoplastic.

Process parameters which control fiber formation from the thermoplastic polymers include: the spinneret orifice design, dimension and number; the extrusion rate of polymer through the orifices; the quench air velocity; and the rotational speed of the die. The filament diameter can be influenced by all of the above parameters with filament diameter typically increasing with larger spinneret orifices, higher extrusion rates per orifice, lower air quench velocity and lower rotary die rotation with other parameters remaining constant. Productivity is influenced by the dimension and number of spinneret orifices, the extrusion rate and, for a given denier fiber, the rotary die rotation.

In general, any suitable thermoplastic resin can be used in making the self-bonded, fibrous nonwoven webs used to make the self-bonded nonwoven web composites of the present invention. Suitable thermoplastic resins include polyolefins of branched and straight-chained olefins such as low density polyethylene, linear low density polyethylene, high density polyethylene, polypropylene, polybutene, polyamides, polyesters such as polyethylene terephthalate, combinations thereof and the like.

The term "polyolefins" is meant to include homopolymers, copolymers and blends of polymers prepared from at least 50 wt % of an unsaturated hydrocarbon monomer. Examples of such polyolefins include polyethylene, polystyrene, polyvinyl chloride, polyvinyl acetate, polyvinylidene chloride, polyacrylic acid, polymethacrylic acid, polymethyl methacrylate, polyethyl acrylate, polyacrylamide, polyacrylonitrile, polypropylene, polybutene-1, polybutene-2, polypentene-1, polypentene-2, poly-3-methylpentene-1, poly-4-methylpentene-1, polyisoprene, polychloroprene and the like.

Mixtures or blends of these thermoplastic resins and, optionally, thermoplastic elastomers such as polyurethanes and the like, elastomeric polymers such as copolymers of an isoolefin and a conjugated polyolefin, and copolymers of isobutylenes and the like can also be used.

Preferred thermoplastic resins include polyolefins such as polypropylene, blends of polypropylene and polybutene, and blends of polypropylene and linear low density polyethylene. The polypropylene (PP) used by itself or in blends with polybutene (PB) and/or linear low density polyethylene (LLDPE) preferably has a melt flow rate in the range of about 10 to about 80 g/10 min as measured by ASTM D-1238. Blends of polypropylene and polybutene and/or linear low density polyethylene provide self-bonded nonwoven webs with softer hand such that the web has greater flexibility and/or less stiffness.

Additives such as colorants, pigments, dyes, opacifiers such as $TiO_2$, UV stabilizers, fire retardant compositions, processing stabilizers and the like can be incorporated into the polypropylene, thermoplastic resins and blends.

The blends of polypropylene and PB can be formulated by metering PB in liquid form into a compounding extruder by any suitable metering device by which the amount of PB being metered into the extruder can be controlled. PB can be obtained in various molecular weight grades with high molecular weight grades typically requiring heating to reduce the viscosity for ease of transferring the PB. A stabilizer additive package can be added to the blend of polypropylene and PB if desired. Polybutenes suitable for use can have a number average molecular weight measured by vapor phase osmometry of about 300 to about 3000. The PB can be prepared by well-known techniques such as the Friedel-Crafts polymerization of feedstocks comprising isobutylene, or they can be purchased from a number of commercial suppliers such as Amoco Chemical Company, Chicago, Ill., which markets polybutenes under the tradename Indopol ®. A preferred number average molecular weight for PB is in the range of about 300 to about 2500.

PB can be added directly to polypropylene or it can be added via a masterbatch prepared by adding PB to polypropylene at weight ratios of 0.2 to 0.3 based on polypropylene in a mixing device such as a compounding extruder with the resulting masterbatch blended with polypropylene in an amount to achieve a desired level of PB. For making the self-bonded webs used in making the composites in the instant invention, the weight ratio of PB typically added to polypropylene can range from about 0.01 to about 0.15. When a weight ratio PB below about 0.01 is added to polypropylene, little beneficial effects such as better hand and improved softness are shown in the blends, and when polybutene is added at a weight ratio above about 0.15, minute amounts of PB can migrate to the surface which may detract from the fabric appearance. Blends of polypropylene and PB can have a weight ratio of polypropylene in the range of about 0.99 to about 0.85, preferably about 0.99 to about 0.9, and a weight ratio of PB in the range of about 0.01 to about 0.15, preferably about 0.01 to about 0.10.

Blends of polypropylene and LLDPE can be formulated by blending polypropylene resin in the form of pellets or powder with LLDPE in a mixing device such as a drum tumbler and the like. The resin blend of polypropylene and LLDPE with optional stabilizer additive package can be introduced to a polymer melt mixing device such as a compounding extruder of the type typically used to produce polypropylene product in a polypropylene production plant and compounded at temperatures between about 300° F. and about 500° F. Although blends of polypropylene and LLDPE can range from a weight ratio of nearly 1.0 for polypropylene to a weight ratio of nearly 1.0 for LLDPE, typically, the blends of polypropylene and LLDPE useful for making self-bonded webs used in the self-bonded nonwoven web and porous film composites of the present invention can have a weight ratio of polypropylene in the range of about 0.99 to about 0.85, preferably in the range of about 0.98 to about 0.92, and a weight ratio of LLDPE in the range of about 0.01 to about 0.15, preferably in the range of about 0.02 to about 0.08. For weight ratios less than 0.01 the softer hand properties imparted from the LLDPE are not obtained, and for weight ratios above 0.15 less desirable physical properties and a smaller processing window are obtained.

The LLDPE can be random copolymers of ethylene with 1 to 15 weight percent of higher olefin co-monomers, such as propylene, n-butene-1, n-hexene-1, n-octene-1 or 4-methylpentene-1, produced over transition metal coordination catalysts. Such linear low density polyethylenes can be produced in liquid phase or vapor phase processes. The preferred density of the linear low density polyethylene is in the range of about 0.91 to about 0.94 g/cc.

The self-bonded, fibrous nonwoven web used for at least one layer of the composite of the present invention can be produced by a system 100, schematically shown in FIG. 1. System 100 includes an extruder 110 which extrudes a fiber-forming material such as a thermoplastic polymer melt through feed conduit and adapter 112 to a rotary union 115. A positive displacement melt pump 114 may be located in the feed conduit 112 if the pumping action provided by extruder 110 is not sufficiently accurate for the desired operating conditions. An electrical control can be provided for selecting the rate of extrusion and displacement of the extrudate through the feed conduit 112. Rotary drive shaft 116 is driven by motor 120 at a speed selected by a control means (not shown), and is coupled to rotary die 130. Radial air aspirator 135 is located around rotary die 130 and is connected to air blower 125. Air blower 125, air aspirator 135, rotary die 130, motor 120 and extruder 110 are supported on or attached to frame 105.

In operation, fibers are extruded through and thrown from the rotary die 130 by centrifugal action into a high velocity air stream provided by aspirator 135. The air drag created by the high velocity air causes the fibers to be drawn down from the rotary die 130 and also to be stretched or attenuated. A web-forming plate 145 in the shape of an annular ring surrounds the rotary die 130. As rotary die 130 is rotated and fibers 140 extruded, the fibers 140 strike the web-forming plate 145. Web-forming plate 145 is attached to frame 105 with support arm 148. Fibers 140 are self-bonded during contact with each other and plate 145, thus forming a tubular nonwoven web 150. The tubular nonwoven web 150 is then drawn through the annulus of web-forming plate 145 by pull rolls 170 and 165, through nip rolls 160 supported below rotary die 130 which spreads the fabric into a flat two-ply composite 155 which is collected by pull rolls 165 and 170 and may be stored on a roll (not shown) in a standard fashion.

Figure 2:
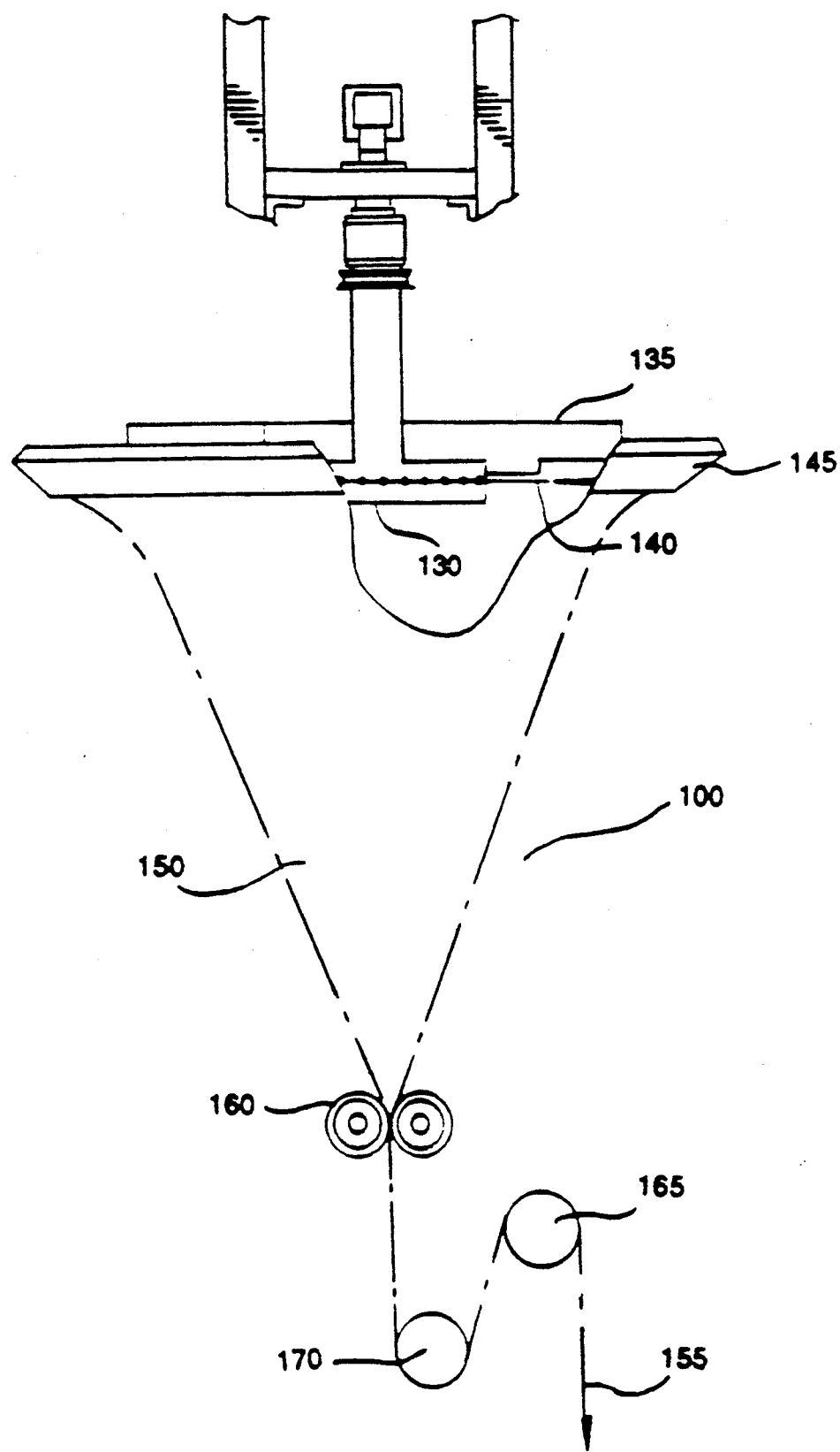
FIG. 2 is a side view of the system of FIG. 1.

FIG. 2 is a side view of system 100 of FIG. 1 schematically showing fibers 140 being extended from rotary die 130, attenuated by the high velocity air from aspirator 135, contacting of fibers 140 on web-forming plate 145 to form tubular nonwoven web 150. Tubular nonwoven web 150 is drawn through nip rolls 160 by pull rolls 170 and 165 to form flat two-ply composite 155.

The self-bonded nonwoven web and porous film composites of the present invention can be produced by adhering at least one layer of a uniform basis weight self-bonded web having a plurality of substantially randomly disposed, substantially continuous filaments having a BWUI of 1.0±0.05 determined from average basis weights having standard deviations of less than 10% to at least one layer of a polymeric porous film. Bonding processes for adhering the web and porous film layers of the composites can be a bonding technique such as thermal, chemical/adhesion and ultrasonic bonding. These bonding techniques can be either point- or area- bonding with the choice of bonding dependent upon the ultimate application for the composite.

In the thermal bonding process, a heated calender is used comprising heated rolls between which are passed the individual layers of the composite to be bonded. The calender rolls can be made from steel, wool and the like and can have working widths up to 3 m or greater and diameters which have the required stiffness and strength to correspond to the working width of the calender. The calender rolls can be oriented such that the composites can pass between the calender rolls in essentially a horizontal or a vertical direction. One or both rolls can contain embossing patterns for point-bonding and can be maintained at a desired temperature by a heating means such as electrical heating, tempered-oil heating and the like. The bonding pattern of the embossing rolls can have a regular or intermittent pattern. Typically, an intermittent pattern is used with the area of composite surface occupied by bonds ranging from about 5 to 50 percent of the surface area, preferably about 10 to about 25 percent of the surface area. The bonding can be done as point-bonding, continuous stripe-, or discontinuous stripe-bonding with the intent of the bonding being to keep the layers of the composites from delaminating, while at the same time not forming an overly stiff composite product. A thermal bonding process useful to form the composites of the present invention employs a calender with a hard steel, embossing roll and a hard steel, smooth roll with both rolls maintained at a temperature of about 200° to about 260° F. and with the embossing roll having an embossing pattern of 256 square/in$^2$ with the squares angled diagonally such that the squares present a diamond-like appearance in the machine or cross-machine direction and with the bonding area representing a nominal 16% of the total surface area. For the present invention, thermal bonding is the preferred bonding process for ease of operation and utilization of typical existing equipment.

The temperature, pressure and embossing patterns on the embossing roll and speed of the nonwoven webs fed to the calender depend on the thermoplastic material used to produce the self-bonded web and the porous film as well as the type of composite desired in terms of stiffness, strength, vapor-permeability, liquid-impermeability and other properties. Calender process parameters such as the temperature of the embossing rolls, the pressure exerted by the rolls on the composite and the speed of the nonwoven webs fed to the calender can be varied to achieve the desired composite. The temperature of the calender rolls can range from about 200° to about 450° F., the pressure exerted on the composite by the rollers can range from about 50 to 750 pounds per linear inch (pli) in the calender nip and the speed of the nonwoven webs fed to the calender can range from about 10 to about 1500 feet per minute (fpm).

If the calender roll temperatures are too low for the particular composite being formed, the layers of the resulting composite may tend to delaminate because of insufficient bonding of the layers; however, if the calender roll temperatures are too high, the web and porous film layers will fuse and form a substantially impervious film and thereby negate the air permeability properties of the composite and may also produce composites with less desirable tensile properties. A secondary calendering operation employing two or more smooth rolls can be employed after the thermobonding process, if desired.

The uniform basis weight self-bonded nonwoven web can be supplied directly from the process described above or from an unwind roll. The web can be either a single-ply or a multi-ply fabric. Preferably, the nonwoven web has a single or multiple two-ply structure such that a self-bonded web having a nominal basis weight of about 1.0 oz/yd$^2$ can comprise two plies of a self-bonded web each having a nominal basis weight of about 0.5 oz/yd$^2$ or two two-ply self-bonded web fabrics with each of the four plies having a nominal basis weight of about 0.25 oz/yd$^2$. A self-bonded web having a total basis weight of 5.0 oz/yd$^2$ would require 10 two-ply self-bonded web fabrics with each ply having a nominal basis weight of 0.25 oz/yd$^2$. For self-bonded webs produced from polypropylene, two-ply fabrics are made with single-ply basis weights of about 0.1 to about 0.25 oz/yd$^2$, and self-bonded webs having heavier basis weights are formed from multiple layers of these two-ply fabrics in order to obtain self-bonded webs with the desired softness, drapability and strength. For blends of polypropylene with polybutene, or linear low density polyethylene, the single ply basis weight of the nonwoven web can be greater than for polypropylene while still retaining softness and drapability properties. Additionally, a two-ply self-bonded web enhances the excellent uniform basis weight of the single plies that make up the two-ply nonwoven webs.

Although the self-bonded nonwoven web can have post-treatment, such as calendering, in one method of producing a multi-layer nonwoven web composite of the present invention no post-treatment of the self-bonded web is used before the composite is formed by thermobonding layers of self-bonded webs to the porous film layer.

For composites of self-bonded webs and porous films made of polypropylene, the embossing roll or the smooth roll can be in contact with the porous film layer and can have a roll temperature in the range of about 230° to about 400° F. and the smooth roll can be in contact with the self-bonded web and can have a smooth roll temperature in the range of about 220° to about 350° F. Before the self-bonded web is fed to the calender rolls, a porous film from a porous film line or an unwind roll is layered onto the self-bonded web before passing between the calender rolls. The porous film is preferably made from a thermoplastic selected from the group consisting of polypropylene, linear low density polyethylene, a blend of polypropylene and polybutene, and a blend of polypropylene and linear low density polyethylene and has a film thickness of about 0.5 mil or greater. The pressure between the embossing roll and the smooth roll is maintained at about 50 to about 750 pli and the multi-layer composites made from polypropylene are produced at speeds of about 10 to about 1500 fpm. For composites in which the porous film is the intermediate layer between two layers of self-bonded webs, both the embossing roll and the smooth roll are in contact with the self-bonded nonwoven webs.

The weight ratio of the self-bonded nonwoven web to the porous film in the composite can range from about 0.2 to about 15. For lightweight composites of less than 1.0 oz/yd$^2$ the weight ratio is typically about 0.5/1 and for composites having basis weights of 5.0 oz/yd$^2$ or greater the weight ratio is typically about 12/1.

One method of making the self-bonded nonwoven web and porous film composite of the present invention having a basis weight of about 0.5 oz/yd$^2$ or greater comprises the steps of:

providing to a nip between two counter-rotating rolls with at least one roll embossed with a bonding pattern, at least one layer of a uniform basis weight self-bonded web having a BWUI of 1.0±0.05 determined from average basis weights having standard deviations of less than 10% comprising a plurality of substantially randomly disposed, substantially continuous thermoplastic filaments and at least one layer of a polymeric porous film and bonding the self-bonded nonwoven web and the polymeric porous film together at a speed of about 10 to about 1500 fpm in the nip with an embossing roll temperature maintained in the range of about 200° to about 450° F. and a smooth roll temperature maintained in the range of about 200° to about 450° F. with a pressure between the embossing roll and the smooth roll maintained at about 50 to about 750 pli. To facilitate the preparation of composites having the desired physical properties including basis weight, MVTR, appearance and feel the preferred basis weight of the self-bonded web is about 0.1 oz/yd$^2$ or greater and the filaments making up the web have deniers preferably in the range of about 0.5 to about 20. The preferred material of construction for the porous film is polypropylene and the preferred thickness of the porous film is about 0.1 mil or greater.

For a self-bonded nonwoven web and porous film comprising a layer of a uniform basis weight self-bonded nonwoven web and a layer of a polymeric porous film, a particularly useful application is using the composite for housewrap. The composite properties for this type of application include a weight ratio of self-bonded web to porous film in the range of about 2.0/1 to about 3.0/1 with the basis weight of the self-bonded nonwoven web ranging from about 1.0 oz/yd$^2$ to about 3.0 oz/yd$^2$ and the basis weight of the porous film ranging from about 0.5 oz/yd$^2$ to about 1.0 oz/yd$^2$. The MVTR of the composite is in the range of about 500 to about 2,500 g/m$^2$/24 hr as measured according to ASTM E-96, procedure E.

In one embodiment, the self-bonded nonwoven web and porous film composite of the present invention is a three-layer composite having a basis weight in the range of about 1.0 to about 6.0 oz/yd$^2$ produced by thermal point-bonding a layer of a uniform basis weight self-bonded nonwoven web to each side of a polymeric porous film which has a particularly advantageous application as a vapor-permeable and liquid-impermeable construction fabric such as house wrap, vehicle covers and the like.

For a three-layer composite comprising a self-bonded nonwoven web thermobonded to both sides of a polymeric porous film, typical applications vary according to the composite basis weight. Three-layer composites having vapor-permeable and liquid-impermeable properties and a basis weight of about 0.75 to about 2.5 oz/yd$^2$ are useful as protective construction fabric for medical apparel, general protection and chemical protection and liners for sporting apparel. Preferably these fabrics have a MVTR of about 1,500 g/m$^2$/24 hr or greater.

An intermediate basis weight three-layer composite having a basis weight in the range of about 1.5 to about 4.0 oz/yd$^2$ is useful as a vapor-permeable and liquid-impermeable construction fabric such as housewrap and the like. Higher basis weight three-layer composites having basis weights in the range of about 4.0 to about 6.0 oz/yd$^2$ are useful as covers such as for automobiles, motor bikes, stationary equipment and the like. The weight ratio of the self-bonded web to porous film can range from about 5.0/1 to about 12.0/1. The MVTR depends on the particular application and can range from about 500 to about 5,000 g/m$^2$/24 hr (ASTM E-96, procedure E).

In order to provide a vapor permeable and liquid impermeable fabric of sufficient strength and durability the composites of the present invention are provided with uniform basis weight self-bonded webs bonded to polymeric porous films. The self-bonded web comprising a plurality of substantially randomly disposed, substantially continuous thermoplastic filaments used as the protective layer has a very uniform basis weight. The uniform basis weight of the self-bonded web allows lower basis weight self-bonded nonwoven webs to be used to provide strength and durability to the composites, and benefits the consumer with a lighter weight and more economical product.

Among the advantages obtained from the self-bonded nonwoven web and porous film composites of the present invention is a composite comprising two layers of self-bonded nonwoven web calendered with a porous film layer between the nonwoven webs to form a composite with improved MVTR properties together with excellent waterproofness for use in protective clothing applications and air-infiltration barrier applications.

Another advantage is the use of self-bonded nonwoven web from unwind rolls to produce a composite with the desired basis weight and physical properties. This enables composites to be produced in which different layers of the self-bonded nonwoven web composites can have different basis weights, different pigments or different fabric treatments added to the self-bonded webs before the desired self-bonded nonwoven web and porous film composites are produced.

Other self-bonded nonwoven web composites can be formed, including composites having a self-bonded web and a porous film laminated together with a coating material layer, composites having a self-bonded web laminated to a foamed polymer sheet and a porous film layer and the like. The self-bonded web of the composite has the advantage that when laminating polypropylene film to a woven fabric by using a hot melt or other adhesive, the self-bonded web is easier to adhere to than straight polypropylene film which is particularly advantageous when laminating the polypropylene film to woven fabric for sporting apparel. Also, composites can be formed comprising uniform basis weight self-bonded web and porous film layers adhered to a diaper cover stock such as a carded thermobonded polypropylene web having a basis weight in the range of about 0.3 to about 1.0 oz/yd$^2$. The carded web provides a soft layer for possible skin contact, and the self-bonded web provides strength and facilitates lamination to woven fabric.

The invention is described further in the examples appearing below with test procedures used to determine properties reported for the examples as follows:

Tensile and Elongation-Test specimens are used to determine tensile strength and elongation according to ASTM Test Method D-1682. Strip tensile strength can be measured in the machine direction (MD) on 1-inch wide samples of the fabric or in the cross-machine direction (CD) and is reported in units of lbs or grams. A high value is desired for tensile strength.

Elongation can also be measured in the MD or in the CD and is reported in units of %. Lower values are desired for elongation.

Trapezoidal Tear Strength-The trapezoidal tear strength (Trap Tear) is determined by ASTM Test Method D-1117 and can be measured in the MD or in the CD and is reported in units of lbs with a high value desired.

Fiber Denier- The fiber diameter is determined by comparing a fiber specimen sample to a calibrated reticle under a microscope with suitable magnification. The fiber denier is calculated from known polymer densities.

Basis Weight- The basis weight for a test sample is determined by ASTM Test Method D-3776 Option C.

Basis Weight Uniformity Index-The BWUI is determined for a nonwoven web by cutting a number of unit area and larger area samples from the nonwoven web. The method of cutting can range from the use of scissors to stamping out unit areas of material with a die which will produce a consistently uniform unit area sample of nonwoven web. The shape of the unit area sample can be square, circular, diamond or any other convenient shape. The unit area is 1 in$^2$, and the number of samples is sufficient to give a 0.95 confidence interval for the weight of the samples. Typically, the number of samples can range from about 40 to 80. From the same nonwoven web an equivalent number of larger area samples are cut and weighed. The larger samples are obtained with appropriate equipment with the samples having areas which are N times larger than the unit area samples, where N is about 12 to about 18. The average basis weight is calculated for both the unit area sample and the larger area sample, with the BWUI ratio determined from the average basis weight of the unit area divided by the average basis weight of the larger area. Materials which have unit area and/or area average basis weights determined with standard deviations greater than 10% are not considered to have uniform basis weights as defined herein.

Moisture Vapor Transmission Rate-The moisture vapor transmission rate (MVTR) was measured according to ASTM E 96-80, procedure E. A total of four 3-in diameter disks were cut out of each film sample to be tested and tested for MVTR. The test was repeated on two disks from each film. A disk specimen was sealed to an aluminum cup containing desiccant that is placed in a 37.8° C., 90% relative humidity environment, and the weight gain of the cup was monitored as a function of time. The test was run for two days and the MVTR was calculated from the slope of the weight gain versus elapsed time line.

Waterproofness-The hydrostatic waterproofness of a material was measured according to ASTM D 751-79, procedure 1. In this test, water pressure on the underside surface of the material under test is gradually increased until leakthrough was observed on the surface. This test was performed on both film and composite samples without a backing support, as well as on backing-supported samples in which a woven nylon backing fabric was used on the top side of the test specimen to prevent the specimen from bursting due to the applied stress of the water before leakthrough was detected.

Preparation of self-bonded nonwoven webs from polypropylene having a BWUI of 1.0075 from blends of polypropylene and polybutene and from blends of polypropylene and linear low density polyethylene are given below.

SELF-BONDED NONWOVEN POLYPROPYLENE WEB PREPARATION

A polypropylene resin, having a nominal melt flow rate of 35 g/10 min was extruded at a constant extrusion rate into and through a rotary union, passages of the rotating shaft and manifold system of the die and spinnerets to an annular plate similar to the equipment as shown in FIG. 1 and described above.

The process conditions were:

| Extrusion conditions | |
|---|---|
| Temperature, °F. | |
| Zone-1 | 450 |
| Zone-2 | 500 |
| Zone-3 | 580 |
| Adapter | 600 |
| Rotary Union | 425 |
| Die | 425 |
| Pressure, psi | 200–400 |
| Rotary die conditions | |
| Die rotation, rpm | 2500 |
| Extrudate rate, lb/hr/orifice | 0.63 |
| Air quench conditions | 52 |
| Air quench pressure, inches of H$_2$O | |
| Basis Weight Uniformity Index | |
| Thickness, mils | |
| Number of Samples | 60 |
| Average Thickness | 11.04 |
| Coefficient of Variation | 1.50075 |
| Standard Deviation | 1.22505 |
| Range | 6 |
| Basis Weight | |
| Number of Samples | 60 |
| Test Specimen Type | 1-in square |
| Weight, g | |
| Average | 0.02122 |
| Coefficient of Variation | $1.9578 \times 10^{-6}$ |
| Standard Deviation | $1.3992 \times 10^{-3}$ |
| Range | $5.3 \times 10^{-3}$ |
| Basis Weight, oz/yd$^2$ | 0.9692 |
| Number of Samples | 60 |
| Test Specimen Type | 4-in square |
| Weight, g | |
| Average | 0.3370 |
| Coefficient of Variation | $2.6348 \times 10^{-4}$ |
| Standard Deviation | $1.6232 \times 10^{-2}$ |
| Range | 0.068 |
| Basis Weight, oz/yd$^2$ | 0.9620 |
| Basis Weight Uniformity Index (BWUI) | 1.0075 |

A nominal 1.0 oz/yd$^2$ polypropylene self-bonded nonwoven web was prepared by the method described above and calendered with a hard steel, embossed calender roll and a hard steel, smooth calender roll with both rolls maintained at a temperature of 260° F. with an embossing pattern of 256 squares/in$^2$ with the squares angled diagonally such that the squares present a diamond-like appearance in the machine or cross-machine direction with the bonding area being a nominal 16% of the surface area of the composite with a pressure of 400 psi was maintained on the web. Filament denier, basis weights for 1 in × 1 in square and 4 in × 4 in square samples, cross machine direction and machine direction tensile strengths were determined for this self-bonded nonwoven web, as well as for nominal 1.0 oz/yd$^2$ basis weight spunbond materials such as Kimberly-Clark's Accord (Comparative A), James River's Celestra (Comparative B) and Wayn-Tex's Elite (Comparative C). These properties are summarized in Tables I–V below.

TABLE I

NONWOVEN WEB PROPERTIES
Basis Weight-4 in × 4 in Square Samples

| Property | Self-bonded Nonwoven Web | Comparative A | Comparative B | Comparative C |
|---|---|---|---|---|
| Number of Samples | 60 | 60 | 60 | 18 |
| Sample Area, in$^2$ | 16 | 16 | 16 | 16 |
| Basis Weight, oz/yd$^2$ | | | | |
| Average | 0.968667 | 0.998833 | 1.01317 | 0.967778 |
| Median | 0.97 | 1.01 | 1.00 | 0.98 |
| Variance | $2.43887 \times 10^{-3}$ | $7.09523 \times 10^{-3}$ | $6.84234 \times 10^{-3}$ | $1.42418 \times 10^{-2}$ |
| Minimum | 0.86 | 0.8 | 0.82 | 0.78 |
| Maximum | 1.07 | 1.21 | 1.2 | 1.21 |
| Range | 0.21 | 0.41 | 0.38 | 0.43 |
| Standard Deviation (SD) | 0.0493849 | 0.0842332 | 0.0827185 | 0.119339 |
| SD, % of Average | 5.10 | 8.43 | 8.16 | 12.33 |

TABLE II

NONWOVEN WEB PROPERTIES
Basis Weight-1 in × 1 in Square Samples

| Property | Self-bonded Nonwoven Web | Comparative A | Comparative B | Comparative C |
|---|---|---|---|---|
| Number of Samples | 60 | 60 | 60 | 60 |
| Sample Area, in$^2$ | 1 | 1 | 1 | 1 |
| Basis Weight, oz/yd$^2$ | | | | |
| Average | 0.993667 | 0.9665 | 0.9835 | 0.945167 |
| Median | 0.99 | 0.965 | 0.97 | 0.97 |
| Variance | $4.50836 \times 10^{-3}$ | 0.0186774 | 0.0245214 | 0.0251847 |
| Minimum | 0.88 | 0.69 | 0.69 | 0.62 |
| Maximum | 1.17 | 1.26 | 1.32 | 1.34 |
| Range | 0.29 | 0.57 | 0.63 | 0.72 |
| Standard Deviation (SD) | 0.0671443 | 0.136665 | 0.156593 | 0.158697 |
| SD, % of Average | 6.76 | 14.14 | 15.92 | 16.79 |
| BWUI | 1.026 | 0.968* | 0.971* | 0.977* |

*SD 10% of average for one or both basis weights.

TABLE III

NONWOVEN WEB PROPERTIES
Filament Denier

| Property | Self-bonded Nonwoven Web | Comparative A | Comparative B | Comparative C |
|---|---|---|---|---|
| Number of Samples | 100 | 100 | 100 | 100 |
| Denier | | | | |
| Average | 2.254 | 2.307 | 3.962 | 5.295 |
| Median | 1.7 | 2.2 | 4.2 | 5.8 |
| Variance | 1.22473 | 0.206718 | 0.326622 | 0.82048 |
| Minimum | 0.9 | 1.2 | 2.8 | 2.2 |
| Maximum | 5.8 | 4.2 | 5.8 | 7.7 |
| Range | 4.9 | 3 | 3 | 5.5 |
| Standard Deviation (SD) | 0.10668 | 0.454663 | 0.571509 | 0.905803 |
| SD, % of Average | 49.10 | 19.71 | 14.42 | 17.11 |

TABLE IV

NONWOVEN WEB PROPERTIES
Cross Machine Direction Tensile Strength

| Property | Self-bonded Nonwoven Web | Comparative A | Comparative B | Comparative C |
|---|---|---|---|---|
| Number of Samples | 30 | 30 | 30 | 18 |
| Tensile Strength, lb | | | | |
| Average | 4.60217 | 9.14053 | 2.94907 | 4.00072 |
| Median | 4.694 | 9.035 | 2.772 | 3.9435 |
| Variance | 0.19254 | 2.09982 | 0.271355 | 1.71677 |
| Minimum | 3.742 | 5.318 | 2.166 | 1.399 |
| Maximum | 5.374 | 11.56 | 4.443 | 6.15 |
| Range | 1.632 | 6.242 | 2.277 | 4.751 |
| Standard Deviation (SD) | 0.438794 | 1.44908 | 0.520918 | 1.31025 |
| SD, % of Average | 9.53 | 15.85 | 17.66 | 32.75 |

TABLE V

NONWOVEN WEB PROPERTIES
Machine Direction Tensile Strength

| Property | Self-bonded Nonwoven Web | Comparative A | Comparative B | Comparative C |
|---|---|---|---|---|
| Number of Samples | 30 | 30 | 30 | 18 |
| Tensile Strength, lb | | | | |
| Average | 4.7511 | 5.51813 | 8.56907 | 6.93222 |
| Median | 4.7675 | 5.4755 | 8.7675 | 6.4725 |
| Variance | 0.0789548 | 0.686962 | 1.22762 | 5.84547 |
| Minimum | 4.15 | 3.71 | 6.489 | 3.436 |
| Maximum | 5.251 | 7.04 | 10.21 | 12.16 |
| Range | 1.101 | 3.33 | 3.721 | 8.724 |
| Standard Deviation (SD) | 0.280989 | 0.828832 | 1.10798 | 2.41774 |
| SD, % of Average | 5.91 | 15.02 | 12.93 | 34.88 |

SELF-BONDED NONWOVEN WEB PREPARATION FROM A BLEND OF POLYPROPYLENE AND POLYBUTENE

A blend of 93 wt % of a polypropylene having a nominal melt flow rate of 38 g/10 min and 7 wt % of polybutene having a nominal number average molecular weight of 1290 was melt-blended in a Werner & Pfleiderer ZSK-57 twin-screw extruder and Luwa gear pump finishing line. The resulting product was extruded at a constant extrusion rate into and through a rotary union, passages of the rotating shaft and manifold system of the die and spinnerets to an annular plate in the equipment as shown in FIG. 1 and described above.

The process conditions were:

| Extrusion conditions | |
|---|---|
| Temperature, °F. | |
| Zone-1 | 435 |
| Zone-2 | 450 |
| Zone-3 | 570 |
| Adapter | 570 |
| Rotary Union | 550 |
| Die | 450 |
| Screw rotation, rpm | 50 |
| Pressure, psi | 800 |
| Rotary die conditions | |
| Die rotation, rpm | 2100 |
| Extrudate rate, lb/hr/orifice | 0.78 |
| Calendered product physical characteristics | |
| Filament denier (average) | 3–4 |
| Basis weight, oz/yd$^2$ | 1.25 |
| Grab tensile MD, lbs | 13.4 |
| CD, lbs | 9.0 |
| Elongation MD, % | 150 |
| CD, % | 320 |
| Trap tear MD, lbs | 7.5 |
| CD, lbs | 5.8 |

ORIENTED POROUS FILM PREPARATION A

An oriented porous film was prepared using a homopolymer polypropylene resin powder from Amoco Chemical Company which had a melt flow rate as determined by ASTM D1238 of 3.2 g/10 min. A masterbatch of quinacridone dye (Q-dye) and polypropylene was prepared by adding 0.2 g of dye to 1000 g of polypropylene powder. The masterbatch was homogenized by mixing the components in a plastic bag followed by roll-blending the masterbatch mixture in a large jar for 30 minutes on a roll-blender. From the masterbatch, 17.5 g were added to 1982.5 g of polypropylene powder with the following weight percent (based on the combined weight of masterbatch and polypropylene powder) of additives: 0.04 wt % calcium stearate, 0.07 wt % tetrakis(methylene(3,5-di-t-butyl-4-hydroxyhydrocinnamate))methane and 0.07 wt % tetrakis(2,4-di-t-butylphenyl)4,4'-biphenylene diphosphonite. The blend of masterbatch, polypropylene powder and additives were blended in the same manner as the masterbatch. The blend was melt compounded in a ⅜-inch Brabender extruder at a temperature of 219° C. The resulting melt-extruded blend contained 1.75 ppm of Q-dye which acted as a beta-spherulite nucleating agent. A film containing beta-spherulites was prepared from the blend by using a ⅜-inch Brabender 2325 extruder with a 6-inch wide slot die. The extruder was operated at 50 rpm with four temperature zones maintained at 215°, 220°, 215° and 219° C., respectively. At the exit of the die, three 4-inch diameter chrome plate chill rolls manufactured by C. W. Brabender, Inc., Numbers 1, 2 and 3, were used to condition the nucleated film as it exited the extruder. Chill rolls Numbers 1 and 3 were heated with a 50/50 weight ratio mixture of water and ethylene glycol at a temperature of 100.9° C. Chill roll Number 2 was heated with a 50/50 weight ratio mixture of water and ethylene glycol at a temperature of 104.5° C. The resulting film was wound on a take-up roll. Film containing beta-spherulites from the take-up roll was immersed in an extraction vessel containing toluene for 4 minutes at a temperature of 90.5° C. The porous film resulting from the extraction of beta-spherulites by toluene was dried at 25° C. for 30 minutes. The dried film was oriented by heating the porous film at 132° C. for 5 seconds and oriented in the MD at a stretch ratio of 2:1 and in the CD at a stretch ratio of 3:1 to form an oriented porous polypropylene film. The film typically has a MVTR in the range of about 1,500 to about 5,000 $g/m^2/24$ hr.

The following examples further elaborate the present invention, although it will be understood that these examples are for purposes of illustration, and are not intended to limit the scope of the invention.

EXAMPLE 1

A three-layer self-bonded nonwoven web and porous film composite was made using two layers of a uniform basis weight self-bonded nonwoven web for the outer layers and an oriented porous film as an intermediate layer between the two layers of the self-bonded nonwoven web. The self-bonded nonwoven web was prepared in the form of a two-ply web from a PP having a nominal melt flow rate of 35 g/10 min and had a uniform basis weight of 1.1 $oz/yd^2$ and was wound on an unwind roll. The oriented porous film was prepared as described above under Oriented Porous Film Preparation A from a polypropylene having a melt flow rate of 3.2 g/10 min and had a thickness of 1.6 mil and a basis weight of 0.32 $oz/yd^2$ and was wound on an unwind roll. Two layers of the self-bonded web and porous film were fed from the unwind rolls to a calendering line and thermobonded on an in-line 22-inch wide calender with a hard steel, embossed calender roll and a hard steel, smooth calender roll with both rolls maintained at a temperature of 260° F. The embossing pattern was 256 squares/$in^2$ with the squares angled diagonally such that the squares present a diamond-like appearance in the machine or cross-machine direction with the bonding area being a nominal 16% of the surface area of the composite. A pressure of 150 pli was maintained on the three layers to thermal bond the layers and form a three-layer nonwoven web and porous film composite at a speed of about 15 to 18 fpm. The physical properties of the composite and composite components are given in Table VI below.

EXAMPLE 2

A three-layer self-bonded nonwoven web and porous film composite was made using two layers of a uniform basis weight self-bonded nonwoven web for the outer layers and an oriented porous film between the two layers of the self-bonded nonwoven web as an intermediate layer. The self-bonded nonwoven web was prepared in the form of a two-ply web from a PP having a nominal melt flow rate of 35 g/10 min and had a uniform basis weight of 1.1 $oz/yd^2$ and was wound on an unwind roll. The oriented porous film was prepared as described above under Oriented Porous Film Preparation A from a PP having a melt flow rate of 3.2 g/10 min and had a thickness of 1.9 mil and a basis weight of 0.33 $oz/yd^2$ and was wound on an unwind roll. The self-bonded webs and porous film were fed from the unwind rolls to a calendering line and thermobonded on an in-line 22-inch wide calender with a hard steel, embossed calender roll and a hard steel, smooth calender roll with both rolls maintained at a temperature of 260° F. The embossing pattern and bonding area of the embossing roll was the same as that used in Example 1. A pressure of 150 pli was maintained on the three layers to thermal bond the layers and form a three-layer nonwoven web and porous film composite at a speed of about 15 to 18 fpm. The physical properties of the composite and composite components are given in Table VI below.

EXAMPLE 3

A three-layer self-bonded nonwoven web and porous film composite was made using two layers of a uniform basis weight self-bonded nonwoven web for the outer layers and an oriented porous film between the two layers of the self-bonded nonwoven web as an intermediate layer. The self-bonded nonwoven web was prepared in the form of a two-ply web from a PP having a nominal melt flow rate of 35 g/10 min and had a uniform basis weight of 1.1 $oz/yd^2$ and was wound on an unwind roll. The oriented porous film was prepared as described above under Oriented Porous Film Preparation A from a blend of 80 wt % PP having a melt flow rate of 3.2 g/10 min and 20 wt % ethylene-propylene block copolymer having a melt flow rate of 1.0 g/10 min and had a thickness of 1.9 mil and a basis weight of 0.51 $oz/yd^2$ and was wound on an unwind roll. The self-bonded webs and porous film were fed from the unwind rolls to a calendering line and thermobonded on an in-line 22-inch wide calender with a hard steel, embossed calender roll and a hard steel, smooth calender roll with both rolls maintained at a temperature of 260° F. The embossing pattern and bonding area of the embossing roll was the same as used in Example 1. A pressure of 150 pli was maintained on the three layers to thermal bond the layers and form a three-layer nonwoven web and porous film composite at a speed of about 15 to 18 fpm. The physical properties of the composite and composite components are given in Table VI below.

EXAMPLE 4

A three-layer self-bonded nonwoven web and porous film composite was made using two layers of a uniform basis weight self-bonded nonwoven web for the outer layers and a porous film between the two layers of the self-bonded nonwoven web as an intermediate layer. The self-bonded nonwoven web was prepared in the form of a two-ply web from a PP having a nominal melt flow rate of 35 g/10 min and had a uniform basis weight of 1.1 oz/yd$^2$ and was wound on an unwind roll. The porous film was a microporous $CaCO_3$ filled low density polyethylene (LDPE/$CaCO_3$) film identified as XQ-1421 made by the Consolidated Thermoplastics Co. had a thickness of 1.0 mil and a basis weight of 0.85 oz/yd$^2$ and was wound on an unwind roll. The self-bonded webs and porous film were fed from the unwind rolls to a calendering line and thermobonded on an in-line 22-inch wide calender with a hard steel, embossed calender roll and a hard steel, smooth calender roll with both rolls maintained at a temperature of 235° F. The embossing pattern and bonding area of the embossing roll was the same as used in Example 1. A pressure of 150 pli was maintained on the three layers to thermal bond the layers and form a three-layer nonwoven web and porous film composite at a speed of 15 to 18 fpm. The physical properties of the composite and composite components are given in Table VI below.

TABLE VI

COMPOSITE PROPERTIES

| Property | Example 1 | Example 2 | Example 3 | Example 4 |
|---|---|---|---|---|
| Porous Film | | | | |
| Composition | PP | PP | Blend | LDPE/$CaCO_3$ |
| Thickness, mil | 1.6 | 1.9 | 1.9 | 1.0 |
| Basis Weight, oz/yd$^2$ | 0.32 | 0.33 | 0.51 | 0.85 |
| Porosity, % | 71 | 74 | 60 | NM |
| MVTR, g/m$^2$/24 hr | 3488 | 4270 | 3700 | 103 |
| Waterproofness with backing, psi | 87 | 1 | 68 | 6 |
| Self-Bonded Web | | | | |
| Composition | PP | PP | PP | PP |
| Basis Weight, oz/yd$^2$ | 1.1 | 1.1 | 1.1 | 1.1 |
| Composite | | | | |
| Basis Weight, oz/yd$^2$ | 2.45 | 2.55 | 2.48 | 2.90 |
| MVTR, g/m$^2$/24 hr | 2177 | 4208 | 2413 | 213 |
| Waterproofness | | | | |
| with backing, psi | 150 | NM | 100 | NM |
| un-backed, psi | 29 | 3 | 30 | 3 |

NM-Not Measured

That which is claimed is:

1. A self-bonded nonwoven web and porous film composite comprising,
    at least one layer of a uniform basis weight self-bonded, fibrous nonwoven web comprising a plurality of substantially randomly disposed, substantially continuous thermoplastic filaments wherein said web has a Basis Weight Uniformity Index of 1.0±0.05 determined from average basis weights having standard deviations of less than 10%, adhered to
    at least one layer of a vapor-permeable polymeric porous film.

2. The composite of claim 1 wherein said Basis Weight Uniformity Index is 1.0±0.03 determined from average basis weights having standard deviations of less than 10%.

3. The composite of claim 1 wherein said filaments have deniers in the range of about 0.5 to about 20.

4. The composite of claim 1 wherein said self-bonded web comprises a thermoplastic selected from the group consisting of polypropylene, high-density polyethylene, low density polyethylene, linear low density polyethylene, polyamide, polyester, a blend of polypropylene and polybutene and a blend of polypropylene and linear low density polyethylene.

5. The composite of claim 4 wherein said uniform basis weight self-bonded nonwoven web comprises a polypropylene.

6. The composite of claim 4 wherein said uniform basis weight self-bonded web comprises a blend of a polypropylene and a polybutene wherein said polypropylene has a weight ratio of about 0.99 to about 0.85 and wherein said polybutene has a number average molecular weight in the range of about 300 to about 2,500 and has a weight ratio of about 0.01 to about 0.15.

7. The composite of claim 4 wherein said uniform basis weight self-bonded web comprises a blend of a polypropylene and a linear low density polyethylene wherein said polypropylene has a weight ratio of about 0.99 to about 0.85 and wherein said linear low density polyethylene has a density in the range of about 0.91 to about 0.94 g/cc and has a weight ratio of about 0.01 to about 0.15.

8. The composite of claim 1 wherein said porous film comprises a propylene-based resin or a low density polyethylene and has a moisture vapor transmission rate of about 100 g/m$^2$/24 hr or greater as determined according to ASTM E-96, procedure E.

9. A self-bonded nonwoven web and porous film composite having a basis weight in the range of about 0.2 oz/yd$^2$ or greater comprising,
    at least one layer of a uniform basis weight self-bonded, fibrous nonwoven web having a basis weight of about 0.1 oz/yd$^2$ or greater and a Basis Weight Uniformity Index of 1.0±0.05 determined from average basis weights having standard deviations of less than 10% comprising a plurality of substantially randomly disposed, substantially continuous thermoplastic filaments wherein said filaments comprise a thermoplastic selected from the group consisting of polypropylene, high-density polyethylene, low density polyethylene, linear low density polyethylene, polyamide, polyester, a blend of polypropylene and polybutene and a blend of polypropylene and linear low density polyethylene adhered to
    at least one layer of a polymeric vapor-permeable porous film having a basis weight of 0.1 oz/yd$^2$ or greater and a moisture vapor transmission rate of about 2,000 g/m$^2$/24 hr or greater as determined according to ASTM E-96, procedure E, comprising an oriented porous film comprising a low density polyethylene or propylene-based resin comprising a blend of about 70 to 100 wt % of a polypropylene and about 30 to 0 wt % of an ethylene-propylene copolymer having an ethylene content of about 10 to about 50 wt %.

10. The composite of claim 9 wherein said filaments have deniers in the range of about 0.5 to about 20.

11. The composite of claim 9 having a basis weight of about 1.0 to about 4.0 oz/yd² comprising two layers of a polypropylene self-bonded nonwoven web and one layer of the oriented propylene-based resin vapor-permeable porous film located between and bonded to the two layers of the self-bonded web.

12. The composite of claim 1 in the form of a protective fabric having vapor-permeable and liquid-impermeable properties.

13. The composite of claim 9 in the form of an air-infiltration barrier.

14. A self-bonded nonwoven web and porous film composite having a basis weight in the range of about 1.0 to about 6.0 oz/yd² comprising, at least two layers of a uniform basis weight self-bonded, fibrous nonwoven web having a basis weight of about 0.25 oz/yd² or greater and a Basis Weight Uniformity Index of 1.0±0.05 determined from average basis weights having standard deviations of less than 10% comprising a plurality of substantially randomly disposed, substantially continuous thermoplastic filaments wherein said filaments comprise a thermoplastic selected from the group consisting of polypropylene, a blend of polypropylene and polybutene and a blend of polypropylene and linear low density polyethylene and said webs are adhered to at least one layer of an oriented vapor-permeable polymeric porous film having a basis weight of 0.5 oz/yd² or greater comprising a blend of about 70 to 100 wt % of a polypropylene and about 30 to 0 wt % of an ethylene-propylene copolymer having an ethylene content of about 10 to about 50 wt % and formed by the steps of:

(a) forming a homogeneous blend of a propylene-based resin and about 0.5 to about 10 ppm of a nucleating agent capable of producing beta-spherulites, (b) extruding the blend into a film having a thickness of about 0.01 to about 0.4 millimeters on a cast film line having a chill roll temperature of about 90° to about 130° C., (c) cooling the film below the crystallization temperature of the propylene-based resin to form at least 20 wt % beta-spherulites in the film, (d) extracting beta-spherulites corresponding to at least 15 wt % of the blend from the cast film by immersing the cast film in a toluene bath at a temperature of about 85° to about 95° C. for a time period of 10 minutes or less to form a porous film and drying the porous film at a temperature of about 15° to about 110° C. for 20 minutes or less, and (e) orienting the porous film be heating the porous film at a temperature of about 115° to about 135° C. for a time period of about 2 to about 20 seconds and stretching the heated porous film in at least one direction at a stretch ratio of about 1.5 to about 7.5 to form the oriented porous film.

15. The composite of claim 14 wherein said oriented porous film has a moisture vapor transmission rate of about 2,000 g/m²/24 hr or greater as determined according to ASTM E-96, procedure E.

16. The composite of claim 14 wherein said propylene-based resin comprises a polypropylene having a melt flow rate of about 1.0 to about 10 as measured by ASTM D-1238 or a blend of about 70 to about 80 wt % of a polypropylene having a melt flow rate of about 1.0 to about 10 as measured by ASTM D-1238 and about 20 to about 30 wt % of an ethylene-propylene copolymer having an ethylene content of about 10 to about 50 wt % and having a melt flow rate of about 0.5 to about 10 as measured by ASTM D-1238.

17. The composite of claim 14 in the form of a vapor-permeable and liquid-impermeable construction fabric.

* * * * *